United States Patent
Geluk et al.

(10) Patent No.: US 12,534,107 B2
(45) Date of Patent: Jan. 27, 2026

(54) METHOD TO OPERATE A VEHICLE, METHOD TO TEST AN AUTONOMOUS DRIVING SYSTEM, SYSTEM WITH A VEHICLE

(71) Applicant: Siemens Industry Software NV, Leuven (BE)

(72) Inventors: Theo Geluk, Tholen (NL); Son Tong, Leuven (BE)

(73) Assignee: Siemens Industry Software NV, Leuven (BE)

( * ) Notice: Subject to any disclaimer, the term of this patent is extended or adjusted under 35 U.S.C. 154(b) by 76 days.

(21) Appl. No.: 18/714,973

(22) PCT Filed: May 17, 2022

(86) PCT No.: PCT/EP2022/063303
§ 371 (c)(1),
(2) Date: May 30, 2024

(87) PCT Pub. No.: WO2023/104351
PCT Pub. Date: Jun. 15, 2023

(65) Prior Publication Data
US 2025/0026372 A1    Jan. 23, 2025

(30) Foreign Application Priority Data
Dec. 8, 2021  (EP) .................................... 21213207

(51) Int. Cl.
*B60W 60/00*    (2020.01)
*B60W 50/04*    (2006.01)

(52) U.S. Cl.
CPC ...... *B60W 60/0011* (2020.02); *B60W 50/045* (2013.01)

(58) Field of Classification Search
None
See application file for complete search history.

(56) References Cited

U.S. PATENT DOCUMENTS

| | | | |
|---|---|---|---|
| 11,973,790 B2 * | 4/2024 | Klein | H04L 63/1433 |
| 12,387,017 B1 * | 8/2025 | Gabrovski | G06F 8/71 |

(Continued)

FOREIGN PATENT DOCUMENTS

| | | | | |
|---|---|---|---|---|
| DE | 102019216836 A1 | 5/2021 | | |
| KR | 20210117030 A * | 9/2021 | | G06F 8/65 |

OTHER PUBLICATIONS

PCT International Search Report and Written Opinion of International Searching Authority mailed Aug. 26, 2022 corresponding to PCT International Application No. PCT/EP2022/063303.

(Continued)

*Primary Examiner* — Justin S Lee
(74) *Attorney, Agent, or Firm* — Lempia Summerfield Katz LLC (57) ABSTRACT

A method of operating a vehicle includes: sensing the vehicle's surroundings and vehicle's operating parameters by sensors; supporting the vehicle's driving by a first autonomous driving control receiving the sensed surroundings and the sensed operating parameters and the first autonomous driving control generating vehicle driving commands for controlling the vehicle's driving; simulating the vehicle operation by a digital twin of the vehicle that includes a second autonomous driving control generating vehicle operation control commands for controlling the digital twin's driving; aligning the vehicle simulation with the vehicle's driving by feedback of the sensed vehicle's surroundings and the sensed vehicle's operating parameters; and evaluating a detachment criterium and changing the operating mode of the vehicle simulation from being aligned with the vehicle's driving to a detachment of the simulation allowing a deviation of the simulated values to at least one of the sensed vehicle's surroundings and/or sensed vehicle's operating parameters.

8 Claims, 3 Drawing Sheets

(56) References Cited

U.S. PATENT DOCUMENTS

| | | | |
|---|---|---|---|
| 2021/0287459 A1* | 9/2021 | Cella | G07C 5/0808 |
| 2022/0026566 A1* | 1/2022 | Guo | H04W 4/46 |
| 2023/0140909 A1* | 5/2023 | Padmanabhan | G06Q 30/018 |
| | | | 703/6 |

OTHER PUBLICATIONS

Porsche Newsroom, "The Big Loop: artificial intelligence and machine learning" Jul. 16, 2021. pp. 1-6. https://newsroom.porsche.com/en/2021/innovation/porsche-engineering-big-data-loop-25029.html.

Templeton, Brad. "Tesla's 'Shadow' Testing Offers A Useful Advantage On The Biggest Problem In Robocars." Forbes (2019). pp. 1-6.

* cited by examiner

METHOD TO OPERATE A VEHICLE, METHOD TO TEST AN AUTONOMOUS DRIVING SYSTEM, SYSTEM WITH A VEHICLE

The present patent document is a § 371 nationalization of PCT Application Serial No. PCT/EP2022/063303, filed May 17, 2022, designating the United States, and this patent document also claims the benefit of European Patent Application No. 21213207.0, filed Dec. 8, 2021, which are incorporated by reference in their entireties.

TECHNICAL FIELD

The disclosure relates to a method of operating a vehicle. The method includes: sensing the vehicle's surroundings and vehicle's operating parameters by sensors; and supporting the vehicle's driving by a first autonomous driving control receiving the sensed vehicle's surroundings and sensed vehicle's operating parameters and the first autonomous driving control generating vehicle driving commands for at least partly controlling the vehicle's driving. The disclosure further relates to a system including a vehicle, the system being configured to perform the method described herein. The disclosure further relates to a testing and validation method that integrates simulation and physical driving data in a digital twin mode for autonomous driving and ADAS (advanced driver-assistance systems).

BACKGROUND

Autonomous driving testing is one of the main challenges in the automotive industry today. There are several reasons for that, including: safety-critical application (accident on road is not acceptable); time and cost expensive; and government regulations for road testing.

On the other side, the Original Equipment Manufacturers [OEM] and suppliers implement and test their algorithms on traffic in order to validate and certify their technologies.

Some approaches to face these problems are known.

For example, the current popular technologies rely on traditional XiL testing (XiL=something in the loop) such as Model-in-the-Loop (MiL), Software-in-the-Loop (SiL), Hardware-in-the-Loop (HiL), Vehicle-in-the-Loop (ViL), and finally proving ground track testing then benchmarking (e.g., https://www.euroncap.com/en/vehicle-safety/safety-campaigns/2020-assisted-driving-tests/ or https://newsroom.aaa.com/2020/08/aaa-finds-active-driving-assistance-systems-do-less-to-assist-drivers-and-more-to-interfere).

The further in the development, the more complex it may get, enabling an act-by-act validation, including: (1) HIL: requiring all to run real time/embedded, although still making use of virtual (vehicle) state feedback; and (2) VIL: requiring all to run real time/embedded, now making use of the physical (vehicle) state feedback.

This process is time-consuming, expensive, and cannot include all uncertainties and real information from traffic environment. While simulation has been playing a more important role recently, the mismatch between simulation and real-life traffic is still significant.

It is further known to rely on a different type of testing, so-called shadow mode testing which is illustrated under https://www.forbes.com/sites/bradtempleton/2019/04/29/teslas-shadow-testing-offers-a-useful-advantage-on-the-biggest-problem-in-robocars/?sh=1ac1eaf63c06. In this type of shadow testing, a car is being driven by a human maybe supported by an autonomous driving function. A new revision of the autonomous driving function software is parallelly running on the vehicle, receiving data from the sensors but not taking control. This revised software makes decisions about how to drive based on the sensor outputs. Those decisions are compared to the decisions of a human driver or the older version of the autopilot. This shadow mode testing focuses on testing the artificial intelligence pipeline (AI pipeline) in a shadow mode mechanism running in parallel with human-driven car, mainly to test the perception performance such as object, lane lines detection, traffic actors' prediction and other aspects. Advantageously, data is collected enabling improvement of ADAS systems and updating software on cars running on the road.

Porsche Engineering has presented their concept of the so-called "The Big Loop" in development and testing of adaptive cruise control under: https://newsroom.porsche.com/en/2021/innovation/porsche-engineering-big-data-loop-25029.html. This concept underlines the shadow mode as one the of two components of the electronic control unit's (ECU) next to the vehicle full driving stack. Here, a "Scene-Detector" evaluates information about which objects are at what distance from the vehicle derived from interpretation of video data for interesting scenes to be analyzed. The detection of specific scenes is handled by special software called Automated Measurement Data Analytics (AMDA). Packages of detected scenes are transmitted from the vehicle's scene detector to a cloud server and used in virtual test drives that may be produced the cloud environment using a game engine in which the vehicles in the computer physically behave like their real counterparts on the ground. Such simulation results in measurements that correspond to those of the real vehicle bus. The simulation is compared with the real data and false instructions given by an adaptive cruise control may be considered when improving the control. After validation, the driver may decide to download a new release to improve the adaptive cruise control.

These examples of shadow mode driving supported improvement of an adaptive cruise control may have some limitations. One limitation may relate to missing links with simulation environment and hence XIL development process. In case of modifying parameters in the ADAS algorithms, sensor configurations or suspension component, the time and cost of deploying the algorithm in shadow mode, collect-process data then validate results is very significant. Another limitation relates to focusing only on ADAS perception tasks, without concerning vehicle dynamics, and control algorithms testing (e.g., of lane change). For example, it is not possible to test ADAS comfort and vehicle performance using the current Tesla and Porsche Engineering shadow modes.

From DE 10 2019 216 836 A1, a method is known focused on ADAS testing, which relates to creating a simulation model for training/validating ADAS.

SUMMARY

Based on the prior art described above and the problems associated with the art, this disclosure is based on the task of improving the process of validation autonomous driving and ADAS (advanced driver-assistance systems).

The scope of the present disclosure is defined solely by the appended claims and is not affected to any degree by the statements within this summary. The present embodiments may obviate one or more of the drawbacks or limitations in the related art.

In accordance with the disclosure, a solution for the above-described problems by the method includes: simulating the vehicle operation by a digital twin of the vehicle, the digital twin including a second autonomous driving control generating vehicle operation control commands for at least partly controlling the digital twin's driving; aligning the vehicle simulation with the vehicle's driving by feedback of the sensed vehicle's surroundings and the sensed vehicle's operating parameters; and evaluating a detachment criterium and in case the criterium is met changing the operating mode of the vehicle simulation or of at least a copy of the vehicle simulation from being aligned with the vehicle's driving to a detachment of the simulation allowing a deviation of the simulated values to at least one of the sensed vehicle's surroundings and/or sensed vehicle's operating parameters.

A "digital twin," as described herein, refers to a virtual or digital representation that serves as a real-time digital counterpart of a physical object or process. The simulation of the vehicle operation by the digital twin of the vehicle enables real time access to the operating parameters of the vehicle. Sensor data collected from the vehicle may be used to update the digital twin copy of the vehicle's state in real time. A frequent synonym for a digital twin is the term "device shadow."

Aligning the vehicle simulation with the vehicle's driving by feedback from the vehicles sensors may be understood that the simulation follows the vehicle, loke a shadow and the alignment may be done as an elimination of differences in at least the trajectory and may also include a "tuning" or "re-training" of the simulation.

Considering the limitations of the current shadow mode testing, this disclosure enables to use a virtual vehicle "DriveTwin." This "DriveTwin" is to be understood as a digital twin (see also: https.//en.wikipedia.org/wiki/Digital_twin) or executable digital twin (xDT) of the real vehicle during different stages of the development and validation.

This digital twin vehicle module may be operated by an edge device processor as part of the real vehicle enabling autonomous real time digital twin operation.

The DriveTwin may also be operated remotely from the vehicle on a separate processor or via a virtual machine in a cloud environment. The necessity to guarantee an uninterrupted data connection to the DriveTwin would then serve as a disadvantage.

In other words, the conventional shadow mode driving enables to identify situations of deviation of the performance of, e.g., an operative adaptive cruise control during real operation and a test version of a non-operative adaptive cruise control running in shadow mode. This identification is focused on single initial moments only. The conventional shadowing does not monitor any situation beyond this momentary deviation.

According to the disclosure, the complete real vehicle is escorted by a digital twin (i.e., the DriveTwin). The real vehicle and the DriveTwin, respectively, use safety systems like an advanced driver assistant system (ADAS) and/or Adaptive Cruise Control (ACC), which operate as a computer implemented module on basis of a method. The method includes: acquiring sensor output data; evaluating the acquired data; and generating an adaptive cruise control or autonomous driving or safety system output such as status information, (e.g., a warning), which is output via a human-machine interface (HMI) and/or a vehicle/driving control signal and/or traffic status information.

An autonomous driving control may also be understood as any driving supportive feature or module like an adaptive cruise control an autonomous driving system or a driving safety system.

To test the autonomous driving control module method and the evaluation of acquired data and the generating of an autonomous driving control output, the DriveTwin operates a test version of the autonomous driving control that is different to the autonomous driving control being operative on the real vehicle. Starting at a point of deviation, which deviation may fulfill predetermined criteria, between the output of the two autonomous driving control versions, a detachment module is changing the operating mode of the operation simulation or of at least a copy of the operation simulation from receiving sensed real driver vehicle operating actions as an input to receiving corresponding inputs from the second autonomous driving control generating vehicle operating actions, though detaching the simulation or the simulation copy respectively the DriveTwin from the real vehicle's operation.

The disclosure differentiates from conventional Advanced Driver Assistance Systems (ADAS) testing pipelines via integrating both virtual and real environments in the ADAS solution developments. Major benefits of the disclosure include the following.

One benefit relates to saving costs and time in early detection of critical failures and scenarios. This aspect is one of the main challenges of Original Equipment Manufacturers and suppliers. The disclosure enables these savings by running the digital twin of the autonomous car (or DriveTwin) in real traffic.

A second benefit involves incorporating the real traffic data in the XiL development process of perception, planning and control algorithm.

A third benefit includes re-using data for both virtual and physical validation, e.g., from previous software version testing campaigns.

One significant difference to conventional methods that are using a test-based framework is that the disclosure allows to judge on perception level the quality of the system performance (what goes right/wrong). Detected system issues may be used for retraining modules and/or algorithms. The disclosure uses real traffic data to validate the algorithms. Other, conventional approaches use a virtual framework with test data to build/validate that framework. But once built, these frameworks apply a virtual environment or virtual traffic data. This usage of virtual traffic data to validate the algorithms is not sufficient to prepare a system for the real traffic environment.

The disclosure combines that real world data with the virtual framework. One benefit is that modules, being in an early stage of development, may be exposed to real traffic situations. This enables to find issues early, define corner cases, and populate scenarios (virtually) for further testing.

The disclosure further provides a system where a 'human driver' may drive a virtual vehicle through real world data. This assists in improving and potentially training the autonomous driving control using the human driver's driving experience. Further, this practice may assist in discovering weak spots of the respective individual driver or human drivers in general.

One embodiment is outputting a comparison of the autonomous driving control driving control actions or outputs and the human drivers driving actions. This output may be displayed to the driver, e.g., via a vehicle console and may report as an assessment of the driver's driving considering an estimation of perception precision, perception time, reaction time, rection type (steering, braking, both), and maybe other aspects. This report may be optionally done for different versions of the autonomous driving control.

In certain examples, the disclosure provides two important acts. In one act, the method 'tracks' the human driver, hence feeding the physical vehicle test data (perception algorithm output) to the virtual vehicle. In another act, the method detects a critical scenario and 'decouples' the virtual vehicle from the human driver.

These two acts may be defined in more detail. For example, after decoupling, the virtual vehicle 'executes' the decision made by the ADAS algorithms.

The disclosure enables to virtually drive the vehicle through already acquired test data.

Through the presence of a digital twin in each design stage, a close link is provided between different design stages (or left/right side of V-cycle). This feature improves efficiency and saves iteration time.

One possible workflow enhanced by the disclosure may be: identify issues from real world data; build virtual scenarios, expand those, update algorithms/models; test virtually; test according to the disclosure again on real world data—offline (MIL/HIL); and test according to the disclosure gain on real world data—online (in-vehicle).

The disclosure enables to expose a digital twin/xDT to real world traffic data in a closed loop evaluation.

The actual vehicle's states (e.g., position, orientation, speed, etc.) are fed to the simulation, as input for a controller, which provides that the virtual/shadow vehicle copies the behavior (operational states) of the physical vehicle. This closed loop enables corrections and enhancements to the DriveTwin.

In certain examples, in parallel with the above, the method provides continuous running algorithms that detect whether there are important events/scenarios. Once such an event is detected, the virtual/shadow vehicle model may be decoupled from the human driver 'tracking/copying' mode and move to the use of the ADAS algorithms that take care of a specific event (e.g., braking for a pedestrian that crosses the street).

According to an embodiment, the method may further include comparing attributes of the detached simulation with the real vehicles operation recognized from the sensors. The method may further include performing at least one of the following: (i) displaying the comparison results via a human machine interface or a vehicle display; (ii) generating a notification to a vehicle provider; or (iii) initiating an autonomous driving function change unit evaluating on the comparison results if the autonomous driving function ADF may be changed based on the comparison results and the driving module output.

This feedback may be useful to improve the autonomous driving control of the vehicle. The deviations reported are helpful to inform the engineer about deficiencies or the automatically feed into a computer implemented training loop to improve models of the control, e.g., to train such models including artificial intelligence functions.

According to another embodiment, the evaluating of the detachment criterium may include: comparing the vehicle operation control commands of the second autonomous driving control (ADF X.Y) with the first autonomous driving control (ADF 1.0) and setting the detachment criterium to fulfilled in case of significant deviation; and/or assessing criticality of the vehicle's driving and setting the detachment criterium to fulfilled in case the criticality exceeds a criticality threshold.

In certain examples, one criticality indicator or the only criticality indicator may be a prognosed time-to-collision, wherein a severity indicator may further be modelled as an amount of the time derivative of the prognosed time-to-collision or alternatively as a negative time derivative of the prognosed time-to-collision (see, e.g., PCT/EP2022/050269).

According to another embodiment, detaching the simulation allows at least deviating of the simulation from the driving trajectory of the real vehicle. This enables the DriveTwin to use an alternative way or trajectory to deal with the traffic situation and to better understand the consequences of the deviation. Further, the DriveTwin is tested more completely in real traffic under real time conditions.

Further, the disclosure relates to a system including a vehicle, wherein the system is configured to perform a method as described herein. The vehicle includes sensors configured to sense the vehicle's surroundings and vehicle's operating parameters. The vehicle further includes a first autonomous driving control configured to support the vehicle's driving by receiving the sensed vehicle's surroundings and sensed vehicle's operating parameters and the first autonomous driving control (ADF 1.0) generating vehicle driving commands for at least partly controlling the vehicle's driving.

This system includes a digital twin module configured to simulate the operation of the vehicle, wherein the digital twin includes a second autonomous driving control configured to generate vehicle operation control commands for at least partly controlling the digital twin module's driving. The vehicle simulation is aligned with the vehicle's driving by feedback of the sensed vehicle's surroundings and the sensed vehicle's operating parameters.

The system further includes a detachment module configured to evaluate a detachment criterium. In case the criterium is met, the system is configured to change the operating mode of the vehicle simulation or of at least a copy of the vehicle simulation from being aligned with the vehicle's driving to a detachment of the simulation allowing a deviation of the simulated values to at least one of the sensed vehicle's surroundings and/or sensed vehicle's operating parameters.

All modules of the system may be prepared to perform a method as described herein.

BRIEF DESCRIPTION OF THE DRAWINGS

Embodiments of the disclosure are now described, by way of example only, with reference to the accompanying drawings, of which.

The illustration in the drawings is in schematic form.

It is noted that in different figures, similar or identical elements may be provided with the same reference signs.

DETAILED DESCRIPTION

Figure 1:
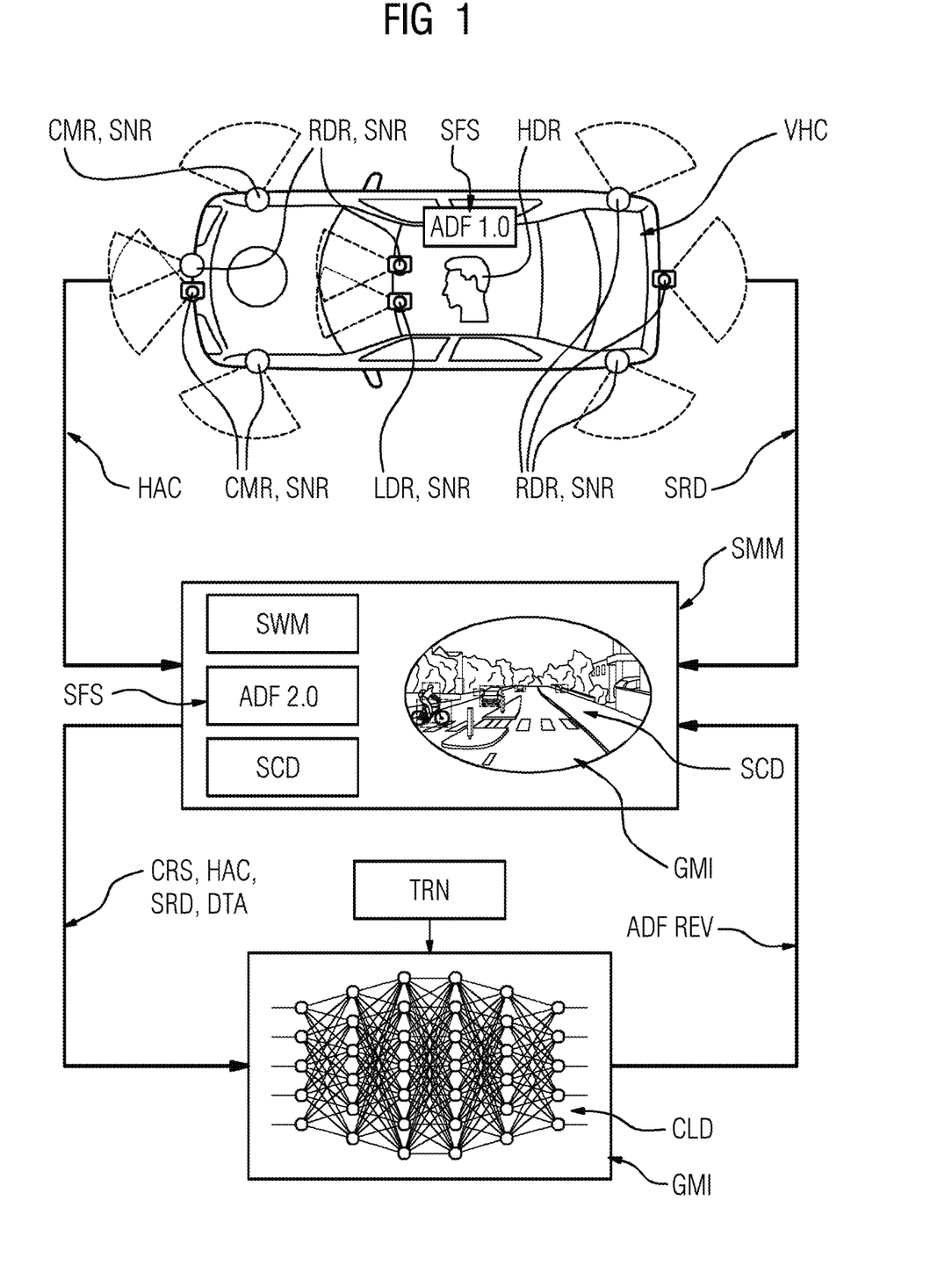
FIG. 1 depicts a simplified flow diagram illustrating the conventional shadow mode operation.

FIG. 1 shows a simplified flow diagram illustrating the conventional shadow mode operation of a vehicle VHC with a safety system or autonomous driving control ADF 1.0.

FIG. 1 shows a conventional shadow mode testing scheme. In this type of shadow testing, a vehicle VHC is being driven by a human driver HDR supported by an autonomous driving function ADF 1.0 or safety system SFS. The terms autonomous driving function ADF 1.0 or safety system SFS may here be used synonymously because the function and concept is not fundamentally different instead both systems are only different regarding the degree of support of driving. The safety system SFS of the vehicle receives input from Sensors SNR, (e.g., camera CMR, LIDAR LDR, radar RDR). As the shadow mode SWM testing a new revision of the autonomous driving function ADF 2.0 software is parallelly running on the vehicle VHC or remotely in a cloud environment, shadow mode SWM module SMM is receiving sensor data SRD from the sensors SNR and control actions HAC of the human driver HDR but not taking control. This revised software makes decisions about how to drive based on the sensor SNR outputs. Those decisions are compared to the decisions of a human driver or the older version of the autonomous driving function ADF 1.0 or safety system SFS.

The shadow mode SWM testing module SMM includes a scene detector SCD, which evaluates information about which objects are at what distance from the vehicle derived from interpretation of video data for interesting scenes to be analyzed.

In a second loop, data is collected in a cloud environment CLD enabling improvement of ADAS systems and updating software on cars running on the road. The collected data DTA includes critical scenarios CRS, detected by the scene detector SCD, the control actions HAC, sensor data SRD. A training module, including the above-mentioned game engine GMI in which the vehicles in the computer-implemented simulation physically behave like their real counterparts on the ground, is used to obtain measurements corresponding to those of the real vehicle bus. These measurements are compared with the real data and false instructions given by an adaptive cruise control may be considered when improving the control. These improvements of the autonomous driving function ADF or safety system SFS are implemented in a revised version ADF REV which is provided to the shadow mode SWM testing as a next testing generation.

Figure 2:
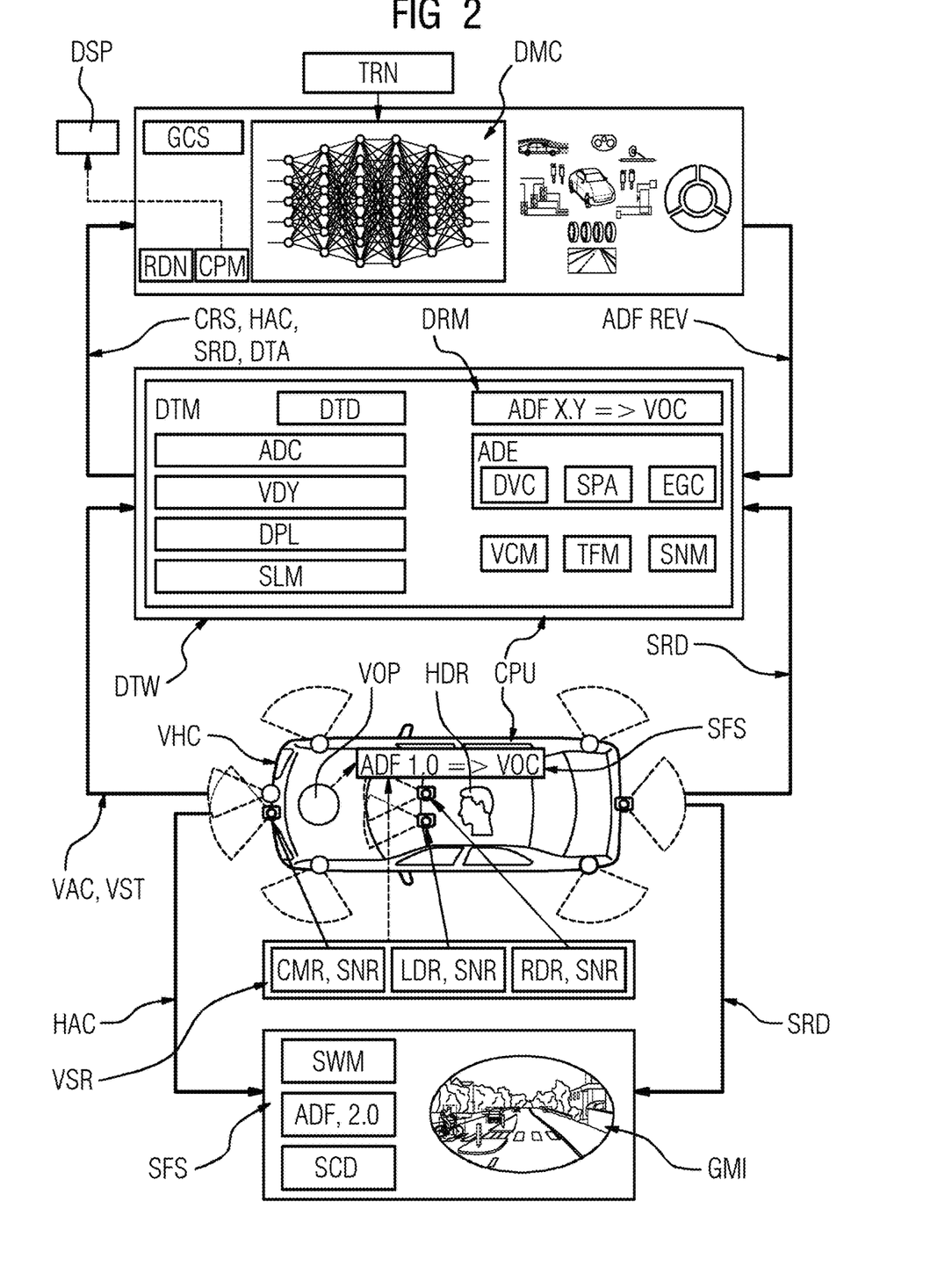
FIG. 2 depicts a simplified flow diagram illustrating an example of the shadow mode operation of a vehicle with a safety system being escorted by a DriveTwin.

FIG. 2 shows a shadow mode testing scheme according to the disclosure in a simplified flow diagram illustrating the shadow mode operation of a vehicle VHC with a safety system SFS being escorted by a DriveTwin DTW. This DriveTwin DTW is to be understood as a digital twin or executable digital twin of the real vehicle VHC during different stages of the development and validation.

The real vehicle's VHC driving is supported by a first autonomous driving control ADF 1.0 receiving the sensed vehicle's surroundings and sensed vehicle's operating parameters and the first autonomous driving control ADF 1.0 generating vehicle VHC driving commands for at least partly controlling the vehicle's VHC driving.

Further, a digital twin DTW respectively digital twin DTM module is simulating the vehicle operation applying a second autonomous driving control ADF X.Y generating vehicle operation control commands for at least partly controlling the digital twin's driving.

As illustrated in FIG. 2 in a schematic depiction of a DriveTwin DTW, which may be considered a simulation of the complete vehicle's driving, the DriveTwin DTW includes modules for: Vehicle dynamics VDY; Autonomous driving control ADC; Driving planning DPL; Simultaneous Localization and Mapping SLM; Autonomous driving performance evaluation module ADE for evaluation of driving comfort DVC, suspension adjustment SPA, energy consumption EGC; Vehicle component models VCM like for components as engine, tires, suspension, seats, lights, etc.; Traffic models TFM; or Sensor models SNM.

Including the feedback from the real vehicle VHC, (e.g., sensor data SRD and vehicle actions VAC and vehicle states VST), the simulation of the complete vehicle VHC may be considered a digital twin DTW with a closed loop to the real world respectively to the real vehicle VHC.

The digital twin DTM module includes a detachment module DTD evaluating a detachment criterium DCR. In case the criterium DCR is met, the digital twin DTM module changes the operating mode of the vehicle simulation or of at least a copy of the vehicle simulation from being aligned with the vehicle's VHC driving to a detachment of the simulation allowing a deviation of the simulated values to at least one of the sensed vehicle's surroundings VSR and/or sensed vehicle's operating parameters VOP.

The method includes a comparing module CPM comparing attributes of the detached simulation with the real vehicles operation recognized from the sensors, wherein the comparison results are output to a vehicle display DSP and/or are provided to a driving module changer DMC evaluating on the comparison actions VAC. The driving module DRM respectively the autonomous driving control ADC may be changed or improved based on the comparison results and the driving module output.

Figure 3:
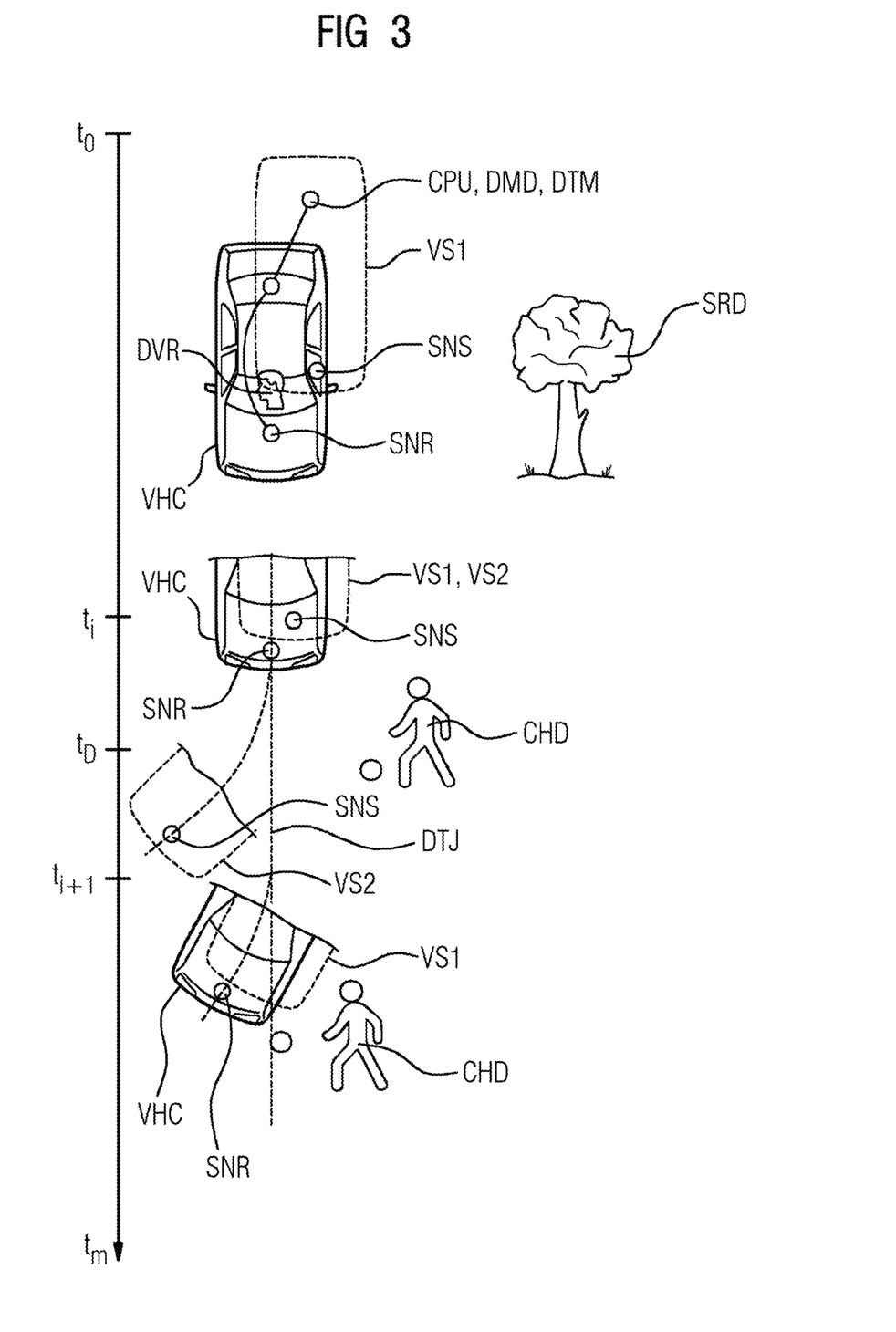
FIG. 3 depicts an example of the method.

FIG. 3 schematically illustrates a shadow mode testing architecture according to the disclosure. Next to conventional elements or modules of a shadow mode, this enhanced shadow mode includes additional modules, (e.g., all available vehicle modules), such as a dynamics-module, a control-module, or sensor-modules. With these modules and algorithms running, they may be linked with XiL (left side of the V-cycle) stages, taking advantages of using and validating with real sensor data. It deploys the same ADAS algorithms pipeline on both shadow modes and allows a tight integration of validation in both virtual and real environment.

As explained above in the context of FIG. 1, the operating parameters of the vehicle VHC include sensed vehicle operating actions VAC of a driver and vehicle's states VST. The illustrated system is provided with an edge device including a processor CPU simulating the vehicle's operation. This processor CPU may be located at the vehicle VHC or remotely in a cloud environment CLD. This operation simulation running on the at least one processor CPU receives at least partly the sensor's SNR output as an input including at least partly the sensed vehicle operating actions VAC and states VST. The system with the digital twin module DTM or DriveTwin DTW includes a driving module DRM or autonomous driving control (ADF X.Y) generating the vehicle operating actions VAC.

The system includes a detachment module DTD changing the operating mode of the operation simulation or of at least a copy of the operation simulation from receiving sensed real driver vehicle operating actions VAC as an input to receiving corresponding inputs from the driving module generating vehicle operating actions, though detaching the simulation or the simulation copy from the real vehicle's operation VAC.

FIG. 3 shows a schematic illustration of the method and the system. The illustration shows the method in different stages of time as indicated by a vertical timescale (t0, ti, tD, tn). In normal mode, at a point of time t0, a vehicle VHC is driven along a driving trajectory DTJ through the surrounding SRD by a human driver DRV controlling the vehicle VHC. The vehicle VHC is equipped with several sensors SNR monitoring the vehicle's VHC operation and the surrounding SRD. During normal driving mode a processor CPU, which may be provided at the vehicle VHC (or remotely connected to the sensors and maybe other vehicles interfaces via wireless data transmission), is simulating the vehicle's VHC operation based on at least partly the sensors' SNR outputs as input.

The vehicle VHC sensors SNR include sensors recording the driver's DRV driving actions like steering, braking, or accelerating as well as the vehicle's VHC states. These are fed into the simulation, wherein a controller provides that the simulated vehicle copies the operation of the actual vehicle, which simulation is illustrated in FIG. 5 as a separate vehicle, so called the (first) shadow vehicle VS1.

At a later point of time ti, an incident happens in the surrounding SRD. As an example, a person CHD comes close to the intended driving trajectory DTJ, and the circumstances indicate a dangerous situation. In this situation, based on a detachment module DTM evaluating permanently the events in the surrounding SRD, the method provides changing the operating mode of the simulation or of at least of a copy or twin of the simulation from receiving the sensors recorded driver's DRV driving actions and the vehicle's VHC states as an input to receiving corresponding inputs from a driving module DMD, though detaching the simulation (or at least one simulation) of a shadow vehicle VS1, VS2 from the real vehicle's VHS operation and trajectory DTJ. The driving module DMD may generate driver's DRV driving actions like steering, braking, or accelerating. The detachment enables an evaluation of at least one different event sequence of the driving during and after the incident and a comparison of the performance of the virtual driving module DMD with the performance of the real driver DRV.

Next to the driving itself, the detachment may also relate at least partly to the surrounding and to the vehicle's operation parameters respectively to the sensor's recognition of these aspects. Since the driving trajectory DTJ of the shadow vehicle VS1, VS2 and the real vehicle become increasingly different, the sensor output of the real vehicle may be altered or adjusted to be input into the simulation of detached shadow vehicle.

A comparing evaluation of the performance of the virtual driving module DMD with the performance of the real driver DRV enables to improve the driving module DMD if the real driver makes decisions and driving actions leading to a more beneficial result. After the incident, the driving module may act as an advisor for the driver or may display evaluations of the incident. In certain examples, the method and system relate to testing of the driving module DMD and the combination of the driving module with the vehicle and in particular in specific situations. If the evaluation of the comparison between the driver DRV and driving module DMD results in a much better performance of the driving module DMD, the driver DRV or the vehicle supplier may decide to enable an autonomous driving function on the basis of the validated driving module DMD.

An additional variant may provide a detachment criteria module enabling to predefine the conditions for detaching a shadow vehicle.

Another embodiment may provide a criteria list for a take-over-control-module for the virtual driving module DMD taking over the control over the vehicle and overruling the driving actions of a real driver. The criteria may include driver attention sensor outputs monitoring, e.g., the eye movement of the driver or the criteria may include thresholds for reaction times of the driver to the incident.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method of operating a vehicle, the method comprising:
   sensing surroundings of the vehicle and operating parameters of the vehicle by at least one sensor;
   supporting a driving of the vehicle by a first autonomous driving control using the sensed surroundings and the sensed operating parameters, wherein the first autonomous driving control generates vehicle driving commands for at least partly controlling the driving of the vehicle;
   simulating an operation of the vehicle by a digital twin of the vehicle to provide a vehicle simulation, wherein the digital twin comprises a second autonomous driving control that generates vehicle operation control commands for at least partly controlling a driving of the digital twin;
   aligning the vehicle simulation with the driving of the vehicle by feedback of the sensed surroundings and the sensed operating parameters; and
   evaluating a detachment criterium and changing an operating mode of the vehicle simulation or at least a copy of the vehicle simulation from being aligned with the driving of the vehicle to a detachment of the vehicle simulation allowing a deviation of simulated values to the sensed surroundings, the sensed operating parameters, or a combination thereof,
   wherein the operating mode is changed when the detachment criterium is fulfilled, and
   wherein the detachment criterium is evaluated by:
      comparing the vehicle operation control commands of the second autonomous driving control with the first autonomous driving control and setting the detachment criterium to fulfilled when a deviation between the first autonomous driving control and the second autonomous driving control exceeds a threshold; and/or
      assessing a criticality of the driving of the vehicle and setting the detachment criterium to fulfilled when the criticality exceeds a criticality threshold.

2. The method of claim 1, wherein the operating mode of the vehicle simulation or the copy of the vehicle simulation is changed when the detachment criterium is met.

3. The method of claim 2, further comprising:
   comparing attributes of the detached simulation with the operation of the vehicle recognized from the at least one sensor to provide comparison results; and
   performing at least one of the following:
      displaying the comparison results via a human machine interface or a vehicle display;
      generating a notification to a vehicle provider; and/or initiating an autonomous driving function change unit evaluating on the comparison results when the autonomous driving function should be changed based on the comparison results and a driving module output.

4. The method of claim 3, wherein the detachment of the vehicle simulation allows at least deviating of the vehicle simulation from a driving trajectory of the vehicle.

5. The method of claim 1, further comprising:
comparing attributes of the detached simulation with the operation of the vehicle recognized from the at least one sensor to provide comparison results; and
performing at least one of the following:
  displaying the comparison results via a human machine interface or a vehicle display;
  generating a notification to a vehicle provider; and/or
  initiating an autonomous driving function change unit evaluating on the comparison results when the autonomous driving function should be changed based on the comparison results and a driving module output.

6. The method of claim 5, wherein the detachment of the vehicle simulation allows at least deviating of the vehicle simulation from a driving trajectory of the vehicle.

7. The method of claim 1, wherein the detachment of the vehicle simulation allows at least deviating of the vehicle simulation from a driving trajectory of the vehicle.

8. A system comprising:
a vehicle having:
  sensors configured to sense surroundings of the vehicle and operating parameters of the vehicle; and
  a first autonomous driving control configured to support a driving of the vehicle by receiving the sensed surroundings and the sensed operating parameters, wherein the first autonomous driving control is configured to generate vehicle driving commands for at least partly controlling the driving of the vehicle;
a digital twin configured to simulate an operation of the vehicle to provide a vehicle simulation, wherein the digital twin comprises a second autonomous driving control configured to generate vehicle operation control commands for at least partly controlling a driving of the digital twin, wherein the vehicle simulation is aligned with the driving of vehicle by feedback of the sensed surroundings and the sensed operating parameters; and
a detachment module configured to evaluate a detachment criterium and change an operating mode of the vehicle simulation or at least a copy of the vehicle simulation from being aligned with the driving of the vehicle to a detachment of the vehicle simulation allowing a deviation of simulated values to the sensed surroundings, the sensed operating parameters, or a combination thereof,
wherein the operating mode is changed when the detachment criterium is fulfilled, and
wherein the detachment criterium is evaluated by:
  comparing the vehicle operation control commands of the second autonomous driving control with the first autonomous driving control and setting the detachment criterium to fulfilled when a deviation between the first and second autonomous driving controls exceeds a threshold; and/or
  assessing a criticality of the driving of the vehicle and setting the detachment criterium to fulfilled when the criticality exceeds a criticality threshold.

* * * * *